(12) United States Patent
Kenmochi (10) Patent No.: US 11,947,732 B2
(45) Date of Patent: Apr. 2, 2024

(54) INPUT CONTROL DEVICE, INPUT CONTROL METHOD, AND PROGRAM

(71) Applicant: Sharp NEC Display Solutions, Ltd., Tokyo (JP)

(72) Inventor: Isamu Kenmochi, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 29 days.

(21) Appl. No.: 17/846,282

(22) Filed: Jun. 22, 2022

(65) Prior Publication Data

US 2022/0317779 A1 Oct. 6, 2022

Related U.S. Application Data

(63) Continuation of application No. PCT/JP2019/051158, filed on Dec. 26, 2019.

(51) Int. Cl.
*G06F 3/023* (2006.01)
*G06F 3/0489* (2022.01)

(52) U.S. Cl.
CPC .......... *G06F 3/0233* (2013.01); *G06F 3/0489* (2013.01)

(58) Field of Classification Search
None
See application file for complete search history.

(56) References Cited

U.S. PATENT DOCUMENTS

2020/0380115 A1* 12/2020 Knight ................ G06F 21/46

FOREIGN PATENT DOCUMENTS

| JP | 2001-242991 A | 9/2001 |
| JP | 2008-097062 A | 4/2008 |
| WO | WO 2011/125200 A1 | 10/2011 |

OTHER PUBLICATIONS

English machine translation of Japanese patent publication JP 2001-242991 A (Year: 2001).*
AS/400e Series 9401 Model 150 setup, ver. 4, first printing, IBM Japan Ltd., 7.5 Password Rules, 1998.
International Search Report (Isr) (PCT Form PCT/ISA/210), in PCT/JP2019/051158, dated Mar. 17, 2020.

* cited by examiner

*Primary Examiner* — Nicholas J Lee
(74) *Attorney, Agent, or Firm* — MCGINN I.P. LAW GROUP, PLLC (57) ABSTRACT

An input control device includes a detection unit configured to detect a first character input by a key operation. The input control device also includes a determination unit configured to determine whether or not the detected first character is the same as a second character input immediately before the first character, and an input processing unit configured to accept an input of the first character when it is determined that the first character is not the same as the second character without accepting the input of the first character when it is determined that the first character is the same as the second character.

12 Claims, 7 Drawing Sheets

INPUT CONTROL DEVICE, INPUT CONTROL METHOD, AND PROGRAM

TECHNICAL FIELD

The present invention relates to an input control device, an input control method, and a program.

BACKGROUND ART

In the related art, various types of technology for preventing a process in which characters are erroneously input by operating keys on a keyboard or the like have been suggested.

For example, Patent Literature 1 mentioned below discloses technology for preventing an erroneous input process by removing chattering in an operation on a key on a keyboard or the like (hereinafter also referred to as a "key operation"). In this technology, if a time interval from the end of a press to the start of the next press is less than or equal to a prescribed interval when a user swings and moves a key while pressing the key using his or her finger, the end and start of the press is deactivated. Thereby, chattering in which the key is considered to have been pressed consecutively is removed.

CITATION LIST

Patent Literature

[Patent Literature 1]
Japanese Unexamined Patent Application, First Publication No. 2008-097062

SUMMARY OF INVENTION

Technical Problem

However, in the technology of Patent Literature 1, when the same character is consecutively input, the input of the next character is removed as chattering if a time interval from the time when the press of the input of a previous character ends to the time when the press of the input of the next character starts is less than or equal to a prescribed interval. Also, when the user needs to input the same character consecutively, the user needs to perform a key operation so that the time interval from the input of the previous character to the input of the next character is longer than the prescribed interval. In this case, the key operations become complicated when the user inputs characters.

In view of the above problems, an objective of the present invention is to provide an input control device, an input control method, and a program capable of reducing the complexity of a key operation in which characters are input while preventing an erroneous input process even if a plurality of characters are input.

Solution to Problem

According to an aspect of the present invention for solving the above problems, there is provided an input control device including: a detection unit configured to detect a first character input by a key operation; a determination unit configured to determine whether or not the detected first character is the same as a second character input immediately before the first character; and an input processing unit configured to accept an input of the first character when it is determined that the first character is not the same as the second character without accepting the input of the first character when it is determined that the first character is the same as the second character.

According to an aspect of the present invention, there is provided an input control method including: detecting, by a detection unit, a first character input by a key operation; determining, by a determination unit, whether or not the detected first character is the same as a second character input immediately before the first character; and accepting, by an input processing unit, an input of the first character when it is determined that the first character is not the same as the second character without accepting the input of the first character when it is determined that the first character is the same as the second character.

According to an aspect of the present invention, there is provided a program for causing a computer to function as: a detection unit configured to detect a first character input by a key operation; a determination unit configured to determine whether or not the detected first character is the same as a second character input immediately before the first character; and an input processing unit configured to accept an input of the first character when it is determined that the first character is not the same as the second character without accepting the input of the first character when it is determined that the first character is the same as the second character.

Advantageous Effects of Invention

According to the present invention, it is possible to reduce the complexity of a key operation in which characters are input while preventing an erroneous input process even if a plurality of characters are input.

DESCRIPTION OF EMBODIMENTS

The present invention relates to an input control system that controls an input of a string by operating a key on a keyboard or the like (hereinafter also referred to as a "key operation"). The string according to the present embodiment is configured so that each character constituting the string is different from an immediately previous character. Thus, a character (a first character) input by the key operation is different from an immediately previously input character (a second character). The string is, for example, a password. The password is a list of characters (including numeric characters) that are input to obtain authentication when a process of logging in to various systems or the like is performed or when a specific function of various applications is used.

The password is specifically a release code generated on the basis of an inquiry code obtained by the user operating the user terminal. When the release code is correctly input to the user terminal, a specific function of the user terminal is activated.

The inquiry code is, for example, a string composed only of numeric characters. Specifically, the numeric characters constituting the inquiry code are decimal numeric characters shown in a decimal system. The release code is a string generated by converting the inquiry code. The characters constituting the release code are not limited to numeric characters.

Hereinafter, embodiments of the present invention will be described in detail with reference to the drawings.

1. First Embodiment

Hereinafter, each embodiment of the present invention will be described in detail with reference to the drawings. First, the first embodiment of the present invention will be described with reference to FIGS. 1 to 8.

<1. Configuration of Input Control System>

Figure 1:
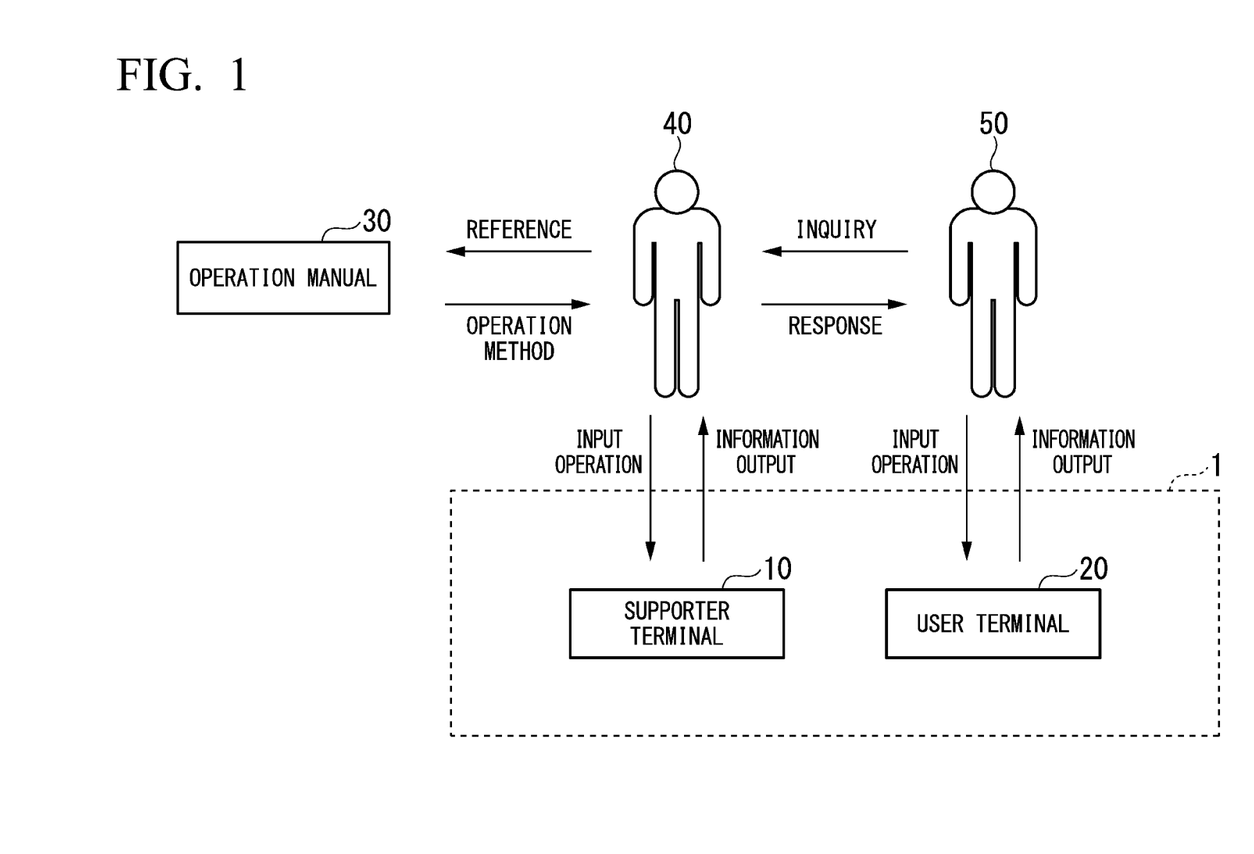
FIG. 1 is a diagram showing an example of a configuration of an input control system according to a first embodiment of the present invention.

First, an example of a configuration of the input control system according to the first embodiment of the present invention will be described with reference to FIG. 1. FIG. 1 is a diagram showing the example of the configuration of the input control system according to the first embodiment of the present invention. As shown in FIG. 1, an input control system 1 includes a supporter terminal 10 and a user terminal 20.

The supporter terminal 10 is a terminal that is operated by a supporter 40. The supporter terminal 10 is implemented by any one of, for example, a personal computer (PC), a tablet terminal, a smartphone, and the like. The supporter terminal 10 includes an input device such as a keyboard or a touch panel. The supporter 40 performs an input process by operating the input device. As an example, the supporter 40 inputs a string such as an inquiry code according to a key operation on the keyboard. Also, the supporter terminal 10 includes a display device such as a display. A result of an input process by the supporter 40 operating the input device of the supporter terminal 10 is displayed on the display device.

The supporter terminal 10 outputs information according to an input operation by the supporter 40. For example, if the input operation is performed by the supporter 40, the supporter terminal 10 executes a process based on the information input by the supporter 40. When the inquiry code has been input, the supporter terminal 10 executes a process of generating a release code (hereinafter also referred to as a "release code generation process") on the basis of the input inquiry code. The supporter terminal 10 generates the release code so that each character of the release code is different from an immediately previous character. After the execution, the supporter terminal 10 outputs an execution result to the display device of the supporter terminal 10.

The user terminal 20 is a terminal that is operated by the user 50 and is an input control device according to the present embodiment. The user terminal 20 is implemented by any one of, for example, a PC, a smartphone, a tablet terminal, and the like. The user terminal 20 includes an input device such as a keyboard or a touch panel. The user 50 performs an input process by operating the input device. For example, the user 50 inputs a string such as a release code according to a key operation on the keyboard. Also, in the present embodiment, the user 50 inputs characters of the string such as the release code in order from a character at the beginning thereof. The keyboard may be a screen keyboard displayed on the touch panel. Also, the user terminal 20 includes a display device such as a display. A result of an input process by the user 50 operating the input device of the user terminal 20 is displayed on the display device.

The user terminal 20 outputs information according to an input operation by the user 50. For example, when an input operation is performed by the user 50, the user terminal 20 executes a process based on the information input by the user 50. When the release code has been input, the user terminal 20 executes a process of determining whether or not an input release code is correct (hereinafter also referred to as a "correctness determination process"). After the execution, the user terminal 20 outputs an execution result to the display device of the user terminal 20.

The supporter 40 and the user 50 are in a state in which they can convey information to each other using a communication means such as a telephone or e-mail. For example, the user 50 asks the supporter 40 about an operation method of the user terminal 20. The supporter 40 who has received an inquiry from the user 50 investigates the operation method with reference to an operation manual 30 and sends a response of the operation method to the user 50. Specifically, the user 50 asks the supporter 40 about an operation method for activating a specific function of the user terminal 20. The supporter 40 who has received the inquiry from the user 50 investigates the operation method for activating the specific function with reference to the operation manual 30 and sends a response of the operation method to the user 50.

<2. Functional Configuration of Supporter Terminal>

Figure 2:
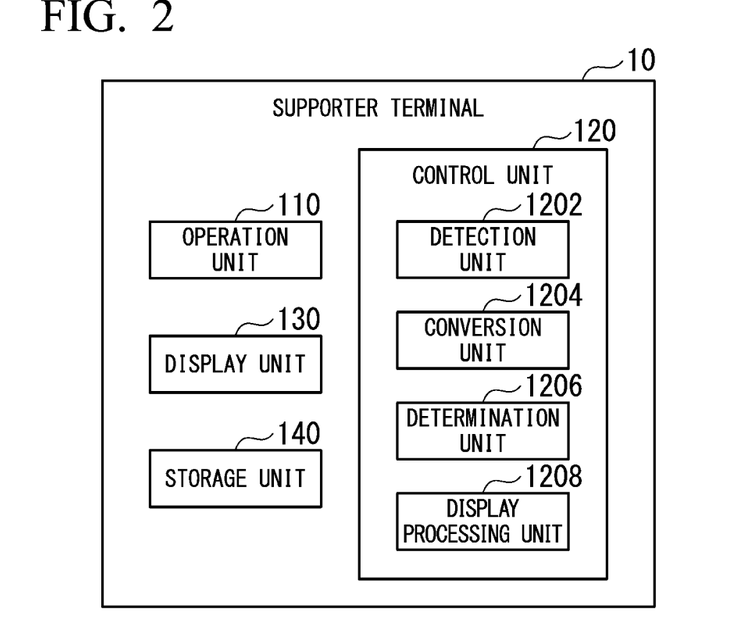
FIG. 2 is a block diagram showing a functional configuration of a supporter terminal according to the first embodiment.

A configuration of the input control system 1 according to the first embodiment of the present invention has been described above. Subsequently, an example of the functional configuration of the supporter terminal 10 according to the first embodiment of the present invention will be described with reference to FIG. 2. FIG. 2 is a block diagram showing the functional configuration of the supporter terminal 10 according to the first embodiment. As shown in FIG. 2, the supporter terminal 10 includes an operation unit 110, a control unit 120, a display unit 130, and a storage unit 140.

(1) Operation Unit 110

The operation unit 110 is configured to include an input device. The operation unit 110 accepts an input by an operation on the input device by the supporter 40. The operation unit 110 outputs input information to the control unit 120.

For example, the operation unit 110 accepts a key operation performed by the supporter 40 as an input. When the input device is a keyboard, the key operation is, for example, an operation in which the supporter 40 presses a key on the keyboard. When the input device is a touch panel, the key operation is, for example, an operation in which the supporter 40 touches a key on a screen keyboard. The operation unit 110 that has accepted the input outputs an input signal indicating a key on which the key operation has been performed to the detection unit 1202 of the control unit 120.

(2) Control Unit 120

The control unit 120 has a function of controlling the overall operation of the supporter terminal 10. In order to implement associated functions, the control unit 120 includes a detection unit 1202, a conversion unit 1204, a determination unit 1206, and a display processing unit 1208.

(2-1) Detection Unit 1202

The detection unit 1202 has a function of detecting characters input by a key operation by the supporter 40. The detection unit 1202 detects an input character on the basis of an input signal input from the operation unit 110. The detection unit 1202 outputs a detection result indicating the detected character to the conversion unit 1204.

For example, the detection unit 1202 detects each character of an inquiry code input by the supporter 40. The detection unit 1202 outputs a detection result indicating the detected inquiry code to the conversion unit 1204.

(2-2) Conversion Unit 1204

The conversion unit 1204 has a function of converting a detected string. The conversion unit 1204 converts the detected inquiry code into a release code. The conversion unit 1204 outputs the release code to the display processing unit 1208.

For example, the conversion unit 1204 generates a release code by converting each numeric character constituting the inquiry code into a character other than a numeric character. In the present embodiment, each numeric character of the inquiry code is converted into any one of four characters of upward, downward, left, and right directions. These four characters are characters that have been converted so that each numeric character of the inquiry code corresponds to any one of keys indicating the upward, downward, left, and right directions. When the release code is composed only of numeric characters, the user inputs the release code using ten numeric keys 0 to 9.

On the other hand, when the release code is composed only of the four characters of the upward, downward, left, and right directions, the user inputs the release code using four direction keys of the upward, downward, left, and right directions. The number of keys adjacent to the direction keys is less than the number of keys adjacent to the numeric keys. Thus, a probability of an erroneous key press operation by the user is reduced. Consequently, it is possible to reduce an erroneous input process according to a key operation.

Also, in the present embodiment, the release code is converted so that each character of the inquiry code is different from an immediately previous character on the basis of a conversion rule (a prescribed rule). Thereby, it is possible to reduce a process in which the user consecutively inputs the same character. An example of conversion of the inquiry code based on the conversion rule will be described below. As an example, an example in which the inquiry code "1234" is converted into the release code "right left upward right left upward downward" will be described.

First, the conversion unit 1204 converts each numeric character in the inquiry code from a decimal numeric character into a ternary numeric character shown in a ternary system. Specifically, the decimal inquiry code "1234" is converted into "1200201." In this way, the inquiry code is converted into a ternary code, which is a string composed of ternary numeric characters.

Subsequently, the conversion unit 1204 converts the ternary code into the release code on the basis of the conversion rule. The conversion rule according to the present embodiment is a rule in which the ternary "0" is converted into "upward," the ternary "1" is converted into "right," the ternary "2" is converted into "downward," and the ternary "3" is converted into "left." Also, the conversion rule is not limited to this example.

When the same numeric character is consecutively included in the ternary code, the same character will be consecutively included in the release code after the conversion. Therefore, the conversion unit 1204 changes each of a numeric character equal to an immediately previous numeric character and a numeric character greater than the immediately previous numeric character among numeric characters in the ternary code to a numeric character different from the immediately previous numeric character. For example, the conversion unit 1204 adds 1 to the numeric character equal to the immediately previous numeric character and the numeric character greater than the immediately previous numeric character (hereinafter also referred to as an "addition process"). That is, the conversion unit 1204 performs the addition process for the numeric character greater than or equal to the immediately previous numeric character.

Specifically, in the case of the ternary code "1200201," the second numeric character "2" from the beginning thereof is greater than the immediately previous numeric character "1." Therefore, the conversion unit 1204 adds 1 to the second numeric character from the beginning of the ternary code and makes a change from "2" to "3."

Also, the fourth numeric character "0" from the beginning of the ternary code is the same as the immediately previous numeric character "0." Therefore, the conversion unit 1204 adds 1 to the fourth numeric character from the beginning of the ternary code and makes a change from "0" to "1."

Also, the fifth numeric character "2" from the beginning of the ternary code is greater than the immediately previous numeric character "0." Therefore, the conversion unit 1204 adds 1 to the fifth numeric character from the beginning of the ternary code and makes a change from "2" to "3."

Also, the seventh numeric character "1" from the beginning of the ternary code is greater than the immediately previous numeric character "0." Therefore, the conversion unit 1204 adds 1 to the seventh numeric character from the beginning of the ternary code and makes a change from "1" to "2."

Thereby, the ternary code "1200201" is converted into "1301302" so that the same numeric character is not consecutively included.

Also, the determination unit 1206 to be described below determines whether or not each numeric character of the ternary code is a numeric character greater than or equal to the immediately previous numeric character. Thus, the conversion unit 1204 outputs each numeric character of the ternary code to the determination unit 1206. The conversion unit 1204 performs a process of changing each numeric character of the ternary code in accordance with a determination result from the determination unit 1206.

The conversion unit 1204 applies a conversion rule to a ternary code that does not consecutively include the same numeric character and converts the ternary code into a release code.

Specifically, in the case of the ternary code "1301302," the numeric character "1" at the beginning thereof is converted into "right."

The second numeric character "3" from the beginning of the ternary code is converted into "left."

The third numeric character "0" from the beginning of the ternary code is converted into "upward."

The fourth numeric character "1" from the beginning of the ternary code is converted into "right."

The fifth numeric character "3" from the beginning of the ternary code is converted into "left."

The sixth numeric character "0" from the beginning of the ternary code is converted into "upward."

The seventh numeric character "2" from the beginning of the ternary code is converted into "downward."

Thereby, the ternary code "1301302" is converted into the release code "right left upward right left upward downward."

(2-3) Determination Unit 1206

The determination unit 1206 has a function of determining whether or not the ternary code consecutively includes a numeric character greater than or equal to an immediately previous numeric character. For example, the determination unit 1206 determines whether or not the numeric character of the ternary code input from the conversion unit 1204 is greater than or equal to an immediately previous numeric character of the ternary code that has been input. After the determination, the determination unit 1206 outputs a determination result to the conversion unit 1204.

(2-4) Display Processing Unit 1208

The display processing unit 1208 has a function of controlling a display process of the display device. For example, the display processing unit 1208 outputs a release code input from the conversion unit 1204 to the display device and causes the display device to display the release code.

(3) Display Unit 130

The display unit 130 is configured to include the display device. The display unit 130 has a function of displaying various types of information. For example, the display unit 130 displays the release code input from the display processing unit 1208. Thereby, the supporter 40 can visually recognize the release code and convey the recognized release code to the user 50.

(4) Storage Unit 140

The storage unit 140 is configured to include a storage device. The storage unit 140 is a storage medium, for example, a hard disk drive (HDD), a flash memory, an electrically erasable programmable read-only memory (EEPROM), a random-access read/write memory (RAM), a read-only memory (ROM), or any combination of these storage media. For the storage unit 140, for example, a non-volatile memory can be used. The storage unit 140 has a function of storing various types of information.

<3. Functional Configuration of User Terminal>

Figure 3:
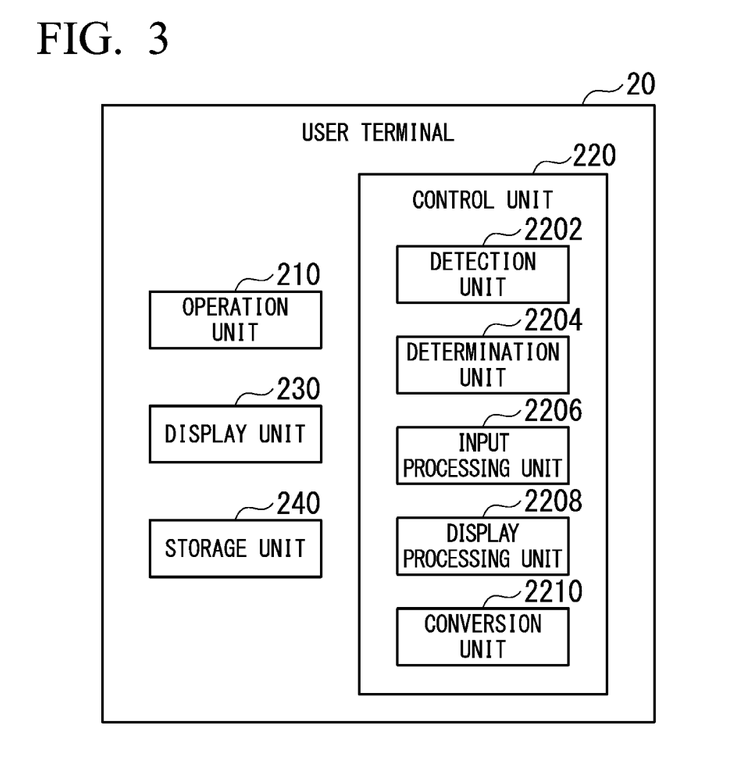
FIG. 3 is a block diagram showing a functional configuration of a user terminal according to the first embodiment.

The functional configuration of the supporter terminal 10 according to the first embodiment of the present invention has been described above. Next, an example of a functional configuration of the user terminal 20 according to the first embodiment of the present invention will be described with reference to FIG. 3. FIG. 3 is a block diagram showing the functional configuration of the user terminal 20 according to the first embodiment. As shown in FIG. 3, the user terminal 20 includes an operation unit 210, a control unit 220, a display unit 230, and a storage unit 240.

(1) Operation Unit 210

The operation unit 210 is configured to include an input device. The operation unit 210 accepts an input by an operation on the input device by the user 50. The operation unit 210 outputs input information to the control unit 220.

For example, the operation unit 210 accepts a key operation performed by the user 50 as an input. When the input device is a keyboard, the key operation is, for example, an operation in which the user 50 presses a key on the keyboard. When the input device is a touch panel, the key operation is, for example, an operation in which the user 50 touches a key on a screen keyboard. The operation unit 210 that has accepted the input outputs an input signal indicating a key on which the key operation has been performed to the detection unit 2202 of the control unit 220.

In the present embodiment, the user inputs a release code according to the key operation. For example, when the release code is composed only of four characters of upward, downward, left, and right directions, the user 50 inputs the release code by operating direction keys of the upward, downward, left, and right directions in the input device. In this case, the operation unit 210 outputs an input signal indicating the operated direction key to the detection unit 2202 of the control unit 220.

(2) Control Unit 220

The control unit 220 has a function of controlling the overall operation of the user terminal 20. In order to implement associated functions, the control unit 220 includes a detection unit 2202, a determination unit 2204, an input processing unit 2206, a display processing unit 2208, and a conversion unit 2210.

(2-1) Detection Unit 2202

The detection unit 2202 has a function of detecting characters input by a key operation by the user 50. The detection unit 2202 detects an input character on the basis of an input signal input from the operation unit 210. The detection unit 2202 outputs a detection result indicating the detected character to the determination unit 2204.

For example, when a character other than a character at the beginning of a string has been input by a key operation, the detection unit 2202 detects the input character as an input determination target (a first character). The input determination target is a character for which an input determination process of determining whether or not the character is the same as a comparison target (a second character), which is an immediately previous character that has been input, is performed. The character at the beginning of the string is detected as a character for which the input determination process is not performed.

Specifically, when the release code "right left upward right left upward downward" is input, "right" at the beginning thereof is detected as a character for which an input determination process is not performed. On the other hand, a character other than "right" at the beginning of the release code is detected as an input determination target.

(2-2) Determination Unit 2204

The determination unit 2204 has a function of determining a detected character. For example, the determination unit 2204 performs an input determination process of determining whether or not the input determination target indicated by the detection result input from the detection unit 2202 is the same as the comparison target (the second character) that is the immediately previous character that has been input. The determination unit 2204 outputs the determination result of the input determination process to the input processing unit 2206.

Also, the character at the beginning of the string is detected as a character for which an input determination process is not performed. Thus, when a detection result related to the character at the beginning of the string has been input, the determination unit 2204 outputs a determination result indicating that the character input by the key operation is a character at the beginning of the string to the input processing unit 2206 without performing the input determination process for the character at the beginning of the string.

Specifically, when the user 50 correctly inputs the release code "right left upward right left upward downward," the input determination process is not performed because "right" at the beginning thereof is not an input determination target.

The second "left" from the beginning of the release code is the input determination target and is compared with "right" at the beginning of the release code that is a comparison target.

Likewise, the third "upward" from the beginning of the release code, the fourth "right" from the beginning thereof, the fifth "left" from the beginning thereof, the sixth "upward" from the beginning thereof, and the seventh "downward" from the beginning thereof are also compared with comparison targets.

In the case of such an example, the determination unit 2204 outputs a determination result indicating that all the input determination targets are not the same as the comparison targets to the input processing unit 2206.

On the other hand, when the user 50 has erroneously input the second character from the beginning of the release code "right left upward right left upward downward" as "right," the second character from the beginning thereof is the same as "right" at the beginning thereof as the comparison target. Thus, the determination unit 2204 outputs a determination result indicating that the second character is the same as the comparison target to the input processing unit 2206.

Also, the determination unit 2204 has a function of determining the string input by the user 50. For example, when the input of the character at the end of the string has been accepted, the determination unit 2204 performs a correctness determination process of determining whether or not the string input by the key operation is correct. The determination unit 2204 outputs a determination result of the correctness determination process to the display processing unit 2208.

In the correctness determination process, the determination unit 2204 compares the correctness determination target, which is a string composed of characters after the conversion process of the conversion unit 2210 to be described below, with a ternary code. The determination unit 2204 determines the correctness on the basis of whether or not the correctness determination target is the same as the ternary code. The ternary code to be compared with the correctness determination target is stored in advance in the storage unit 240 of the user terminal 20. The determination unit 2204 outputs a determination result of the correctness determination process to the display processing unit 2208.

(2-3) Input Processing Unit 2206

The input processing unit 2206 has a function of performing a process on the basis of the determination result of the input determination process input from the determination unit 2204.

When it is determined that the input determination target is not the same as the comparison target, the input processing unit 2206 accepts the input of the input determination target. Thereby, when a character is input by a key operation, only the input of a character different from an immediately previous character that has been input is accepted. When the input of the input determination target has been accepted, the input processing unit 2206 outputs information indicating that the input of the input determination target has been accepted (hereinafter also referred to as "input acceptance information") to the display processing unit 2208 and the conversion unit 2210.

On the other hand, when it is determined that the input determination target is the same as the comparison target, the input processing unit 2206 does not accept the input of the input determination target. Thereby, when the same character is consecutively input when the character is input by the key operation, the input of a subsequently input character among consecutively input characters is not accepted. In the present embodiment, a process of consecutively inputting the same character corresponds to an erroneous input process. However, according to such a configuration, the input corresponding to the erroneous input cannot be accepted. Consequently, the input processing unit 2206 can reduce an erroneous input process in which the same character is consecutively input when the character is input by the key operation.

When the input of the input determination target has not been accepted, the input processing unit 2206 performs a process of waiting until the next character is input by the key operation.

Also, when a determination result indicating that the character input by the key operation is a character at the beginning has been input, the input processing unit 2206 accepts the input of the character at the beginning.

(2-4) Display Processing Unit 2208

The display processing unit 2208 has a function of controlling a display process of the display device. The display processing unit 2208 performs a process according to an input from the determination unit 2204 or the input processing unit 2206.

When input acceptance information has been input from the input processing unit 2206, the display processing unit 2208 performs an input display process of displaying information indicating that the input determination target has been input. In the input display process, for example, the display processing unit 2208 outputs a character of an input determination target to the display unit 230 and causes the display unit 230 to display the character of the input determination target. Also, the display processing unit 2208 may mask the character of the input determination target, output the masked character to the display unit 230, and cause the display unit 230 to display the masked character. On the other hand, when the input acceptance information is not input from the input processing unit 2206, the display processing unit 2208 does not perform the input display process.

When the determination result of the correctness determination processing has been input from the determination unit 2204, the display processing unit 2208 performs a determination result display process of displaying information indicating the determination result of the correctness determination process. When the determination result of the correctness determination process indicates that the input release code is correct, the display processing unit 2208 outputs information indicating that the release code is correct to the display unit 230 and causes the display unit 230 to displays the information.

On the other hand, when the determination result of the correctness determination process indicates that the input release code is incorrect, the display processing unit 2208 outputs information indicating that the release code is incorrect to the display unit 230 and causes the display unit 230 to displays the information.

(2-5) Conversion Unit 2210

The conversion unit 2210 has a function of converting input characters. The conversion unit 2210 converts an input determination target whose input has been accepted into a character before conversion into a character constituting a release code. Thereby, the release code input by the user 50 is converted into a correctness determination target. The conversion unit 2210 outputs the correctness determination target to the determination unit 2204. According to this configuration, if a string obtained after a conversion process of the supporter terminal 10 is input to the user terminal 20, the input string is converted into a string before the conversion process of the supporter terminal 10 and then the correctness determination is made. Consequently, the user terminal 20 can make correctness determination even if the string obtained after the conversion process of the supporter terminal 10 is input.

In the present embodiment, the input determination target is any one of four characters of upward, downward, left, and right directions. For example, the conversion unit 2210 converts these four characters into ternary numeric characters on the basis of an inverse conversion rule. The inverse conversion rule is a rule that performs a rule for performing an inverse conversion process with respect to the conversion rule.

Specifically, the inverse conversion rule is a rule in which "upward" is converted into the ternary "0," "right" is converted into the ternary "1," "downward" is converted into the ternary "2," and "left" is converted into the ternary "3." Also, the conversion rule is not limited to this example.

An example of conversion of the input determination target based on the inverse conversion rule will be described below. As an example, an example in which the release code "right left upward right left upward downward" is converted into the ternary code "1200201" before conversion into the release code will be described.

First, the conversion unit 2210 converts the input determination target whose input has been accepted into a numeric character constituting the ternary code according to the inverse conversion rule.

Specifically, the character at the beginning of the release code, "right," is converted into the numeric character "1" constituting the ternary code.

The second character from the beginning of the release code, "left," is converted into the numeric character "3" constituting the ternary code.

The third character from the beginning of the release code, "upward," is converted into the numeric character "0" constituting the ternary code.

The fourth character from the beginning of the release code, "right," is converted into the numeric character "1" constituting the ternary code.

The fifth character from the beginning of the release code, "left," is converted into the numeric character "3" constituting the ternary code.

The sixth character from the beginning of the release code, "upward," is converted into the numeric character "0" constituting the ternary code.

The seventh character from the beginning of the release code, "downward," is converted into the numeric character "2" constituting the ternary code.

Thereby, the release code "right left upward right left upward downward" is converted into the ternary code "1301302."

Also, as in the above example, the ternary code after the conversion process of the conversion unit 2210 may be different from the ternary code into which the inquiry code has been converted. This is because, when a numeric character greater than or equal to an immediately previous numeric character is included in the ternary code into which the inquiry code has been converted, the addition process is performed for the numeric character greater than or equal to the immediately previous numeric character. Therefore, the conversion unit 2210 subtracts 1 from a specific numeric character among the numeric characters constituting the ternary code into which the input determination target has been converted.

Specifically, first, the conversion unit 2210 converts the input determination target whose input has been accepted into a ternary numeric character. When the numeric character after the conversion is greater than an immediately previous numeric character after the conversion, the conversion unit 2210 subtracts 1 from the numeric character after the conversion (hereinafter also referred to as a "subtraction process"). When the numeric character after the conversion is not greater than the immediately previous numeric character after the conversion, the conversion unit 2210 does not perform the subtraction process.

For example, in the case of the ternary code "1301302" after the conversion process of the conversion unit 2210, the second numeric character "3" from the beginning thereof is greater than an immediately previous numeric character "1." Therefore, the conversion unit 1204 subtracts 1 from the second numeric character from the beginning of the ternary code and makes a change from "3" to "2."

Also, the fourth numeric character "1" from the beginning of the ternary code is greater than the immediately previous numeric character "0." Therefore, the conversion unit 1204 subtracts 1 from the fourth numeric character from the beginning of the ternary code and makes a change from "1" to "0."

Also, the fifth numeric character "3" from the beginning of the ternary code is greater than the immediately previous numeric character "1." Therefore, the conversion unit 1204 subtracts 1 from the fifth numeric character from the beginning of the ternary code and makes a change from "3" to "2."

Also, the seventh numeric character "2" from the beginning of the ternary code is greater than the immediately previous numeric character "0." Therefore, the conversion unit 1204 subtracts 1 from the seventh numeric character from the beginning of the ternary code and makes a change from "2" to "1."

Thereby, the ternary code "1301302" is converted into the ternary code "1200201."

In this way, the conversion unit 2210 can convert the ternary code for which the addition process has been performed into the ternary code before the addition process according to the subtraction process. Thereby, the determination unit 2204 determines that the release code correctly input by the user is correct regardless of whether or not the addition process has been performed when the release code is generated.

(3) Display Unit 230

The display unit 230 is configured to include a display device. The display unit 230 has a function of displaying various types of information. For example, the display unit 230 displays the character of the input determination target input from the display processing unit 2208. At this time, the display unit 230 may display a masked character of the input determination target in accordance with the input from the display processing unit 2208.

In this way, the user 50 can recognize that the input of the input character has been accepted by performing a display process corresponding to the input character. Also, the user 50 can recognize that the input of the input character has not been accepted because the display process corresponding to the input character is not performed.

Also, the display unit 230 displays information indicating that the release code input from the display processing unit 2208 is correct. Thereby, the user 50 can recognize that the input string is correct. Also, the display unit 230 displays information indicating that the release code input from the display processing unit 2208 is incorrect. Thereby, the user 50 can recognize that the input string is incorrect.

(4) Storage Unit 240

The storage unit 240 is configured to include a storage device. The storage unit 240 includes a storage medium, for example, an HDD, a flash memory, an EEPROM, a RAM, a ROM, or any combination of these storage media. For the storage unit 240, for example, a non-volatile memory can be used.

The storage unit 240 has a function of storing various types of information. For example, the storage unit 240 stores the inquiry code and the ternary number code to be compared with the correctness determination target.

<4. Flow of Process>

A functional configuration of the user terminal 20 according to the first embodiment of the present invention has been described above. Subsequently, a flow of a process of the input control system 1 according to the first embodiment will be described with reference to FIGS. 4 to 8.

(1) Flow of Process Related to Display of Inquiry Code

Figure 4:
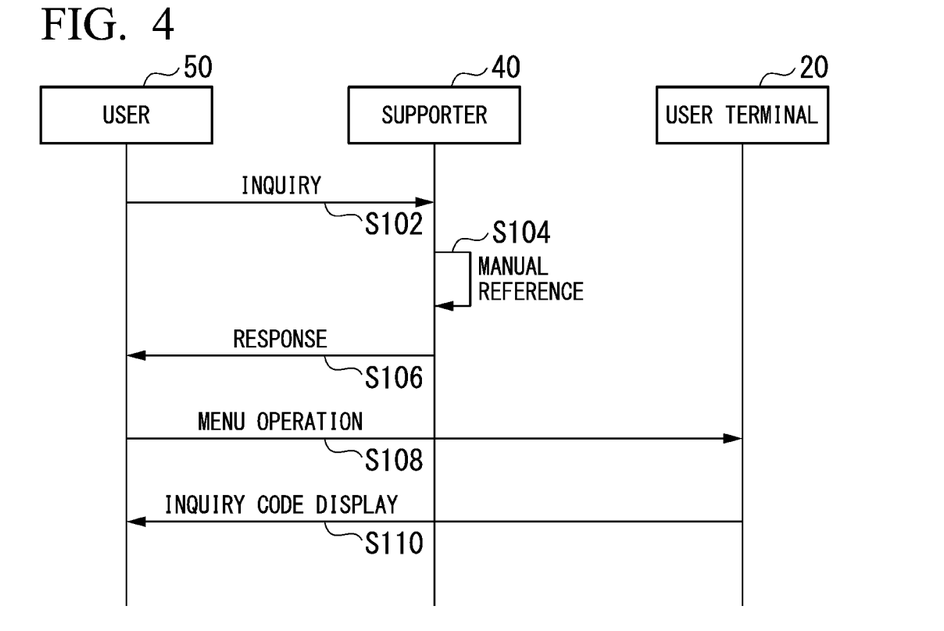
FIG. 4 is a sequence diagram showing a flow of a process related to the display of an inquiry code according to the first embodiment.

First, an example of a flow of a process related to the display of the inquiry code will be described with reference to FIG. 4. FIG. 4 is a sequence diagram showing the flow of the process related to the display of the inquiry code according to the first embodiment.

As shown in FIG. 4, first, the user 50 asks the supporter 40 about an operation method for activating a specific function of the user terminal 20 (S102).

The supporter 40 who has received the inquiry investigates an operation method with reference to the operation manual 30 (S104). After the investigation, the supporter 40 notifies the user 50 of the investigated operation method and makes a response to the inquiry of the user 50 (S106). At this time, the supporter 40 requests the inquiry code displayed on the user terminal 20 according to the operation method transmitted to the user 50.

The user 50 who has received the response operates a menu of the user terminal 20 according to the operation method transmitted from the supporter 40 (S108).

The user terminal 20 who has accepted the operation from the user 50 displays an inquiry code (S110).

(2) Flow of Process Related to Generation of Release Code

Figure 5:
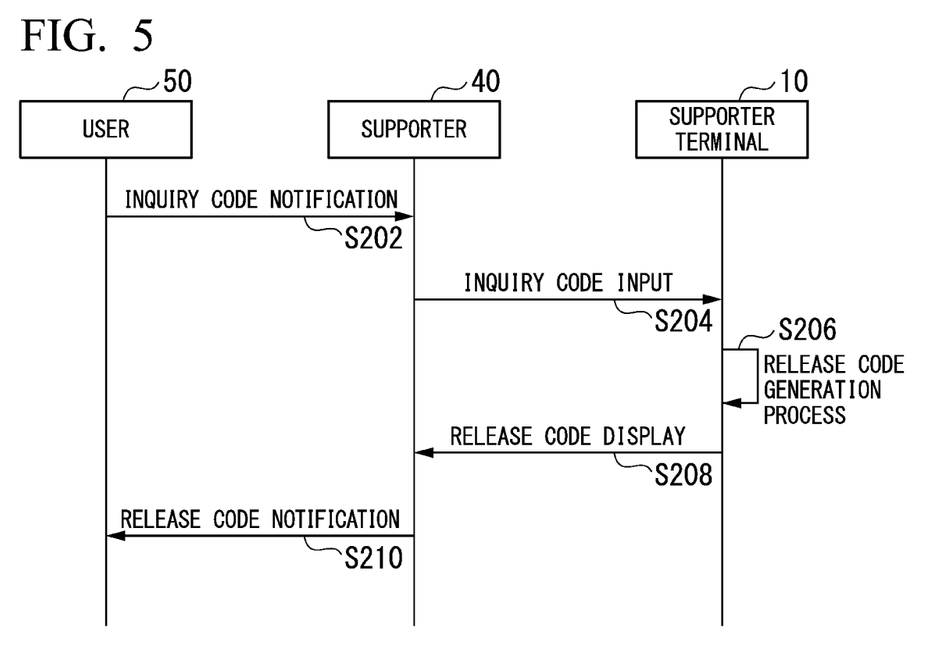
FIG. 5 is a sequence diagram showing a flow of a process related to the generation of a release code according to the first embodiment.

The flow of the process related to the display of the inquiry code has been described above with reference to FIG. 4. Subsequently, an example of a flow of a process related to the generation of the release code will be described with reference to FIG. 5. FIG. 5 is a sequence diagram showing the flow of the process related to the generation of the release code according to the first embodiment.

As shown in FIG. 5, first, the user 50 notifies the supporter 40 of the inquiry code displayed on the user terminal 20 in S110 (S202). The supporter 40 inputs the inquiry code provided in the notification from the user 50 to the supporter terminal 10 (S204).

The supporter terminal 10 performs a release code generation process on the basis of the inquiry code input from the supporter 40 (S206). The supporter terminal 10 displays a generated release code (S208).

The supporter 40 notifies the user 50 of the release code displayed on the supporter terminal 10 (S210).

(3) Flow of Process Related to Input of Release Code

Figure 6:
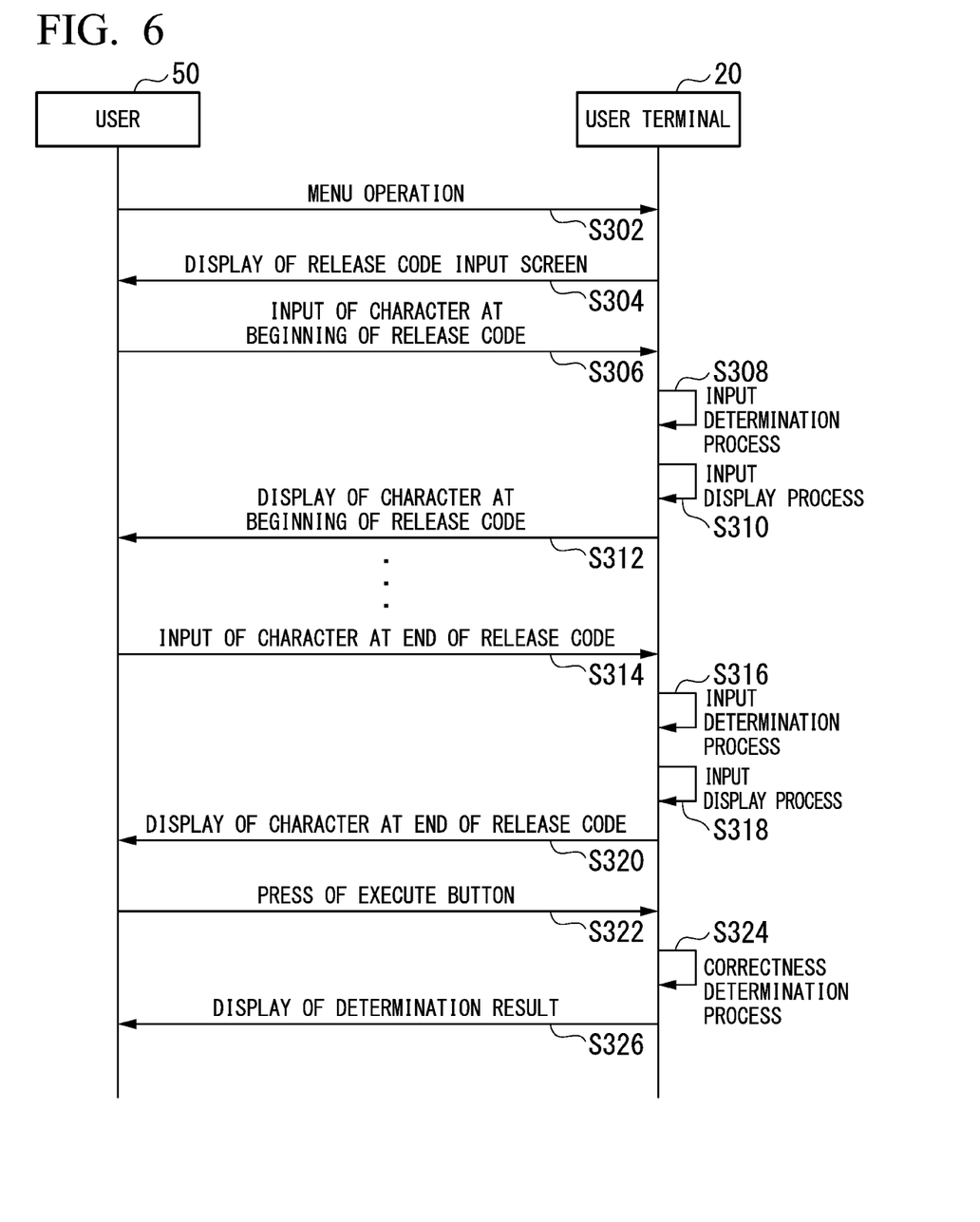
FIG. 6 is a sequence diagram showing a flow of a process related to the input of a release code according to the first embodiment.

The flow of the process related to the generation of the release code has been described above with reference to FIG. 5. Subsequently, an example of a flow of a process related to the input of the release code will be described with reference to FIG. 6. FIG. 6 is a sequence diagram showing the flow of the process related to the input of the release code according to the first embodiment.

As shown in FIG. 6, first, the user 50 operates a menu of the user terminal 20 so that a release code input screen is displayed (S302).

The user terminal 20 that has accepted the operation from the user 50 displays a release code input screen (S304).

The user 50 inputs a character at the beginning of the release code according to a key operation on the input device to the release code input screen displayed on the user terminal 20 (S306).

The user terminal 20 performs an input determination process for the character at the beginning of the release code input to the user 50 (S308). When the input has been accepted by the input determination process, the user terminal 20 performs an input display process (S310) and displays the character at the beginning of the release code (S312).

The processing of S306 to S312 is iterated by the number of characters constituting the release code.

The user 50 inputs the characters of the release code in order from the character at the beginning thereof and inputs a character at the end of the release code (S314).

The user terminal 20 performs an input determination process on the character at the end of the release code input to the user 50 (S316). When the input has been accepted according to the input determination process, the user terminal 20 performs the input display process (S318) and displays the character at the end of the release code (S320).

The user 50 presses an execute button after inputting the character at the end of the release code (S322).

The user terminal 20 performs a correctness determination process with respect to the release code input by the user 50 (S324). The user terminal 20 displays a determination result of the correctness determination process (S326).

Also, when it is determined that the release code is correct, the user terminal 20 activates a specific function of the user terminal 20. On the other hand, when the user terminal 20 determines that the release code is incorrect, the user terminal 20 does not activate a specific function of the user terminal 20.

(4) Flow of Process of Supporter Terminal 10

Figure 7:
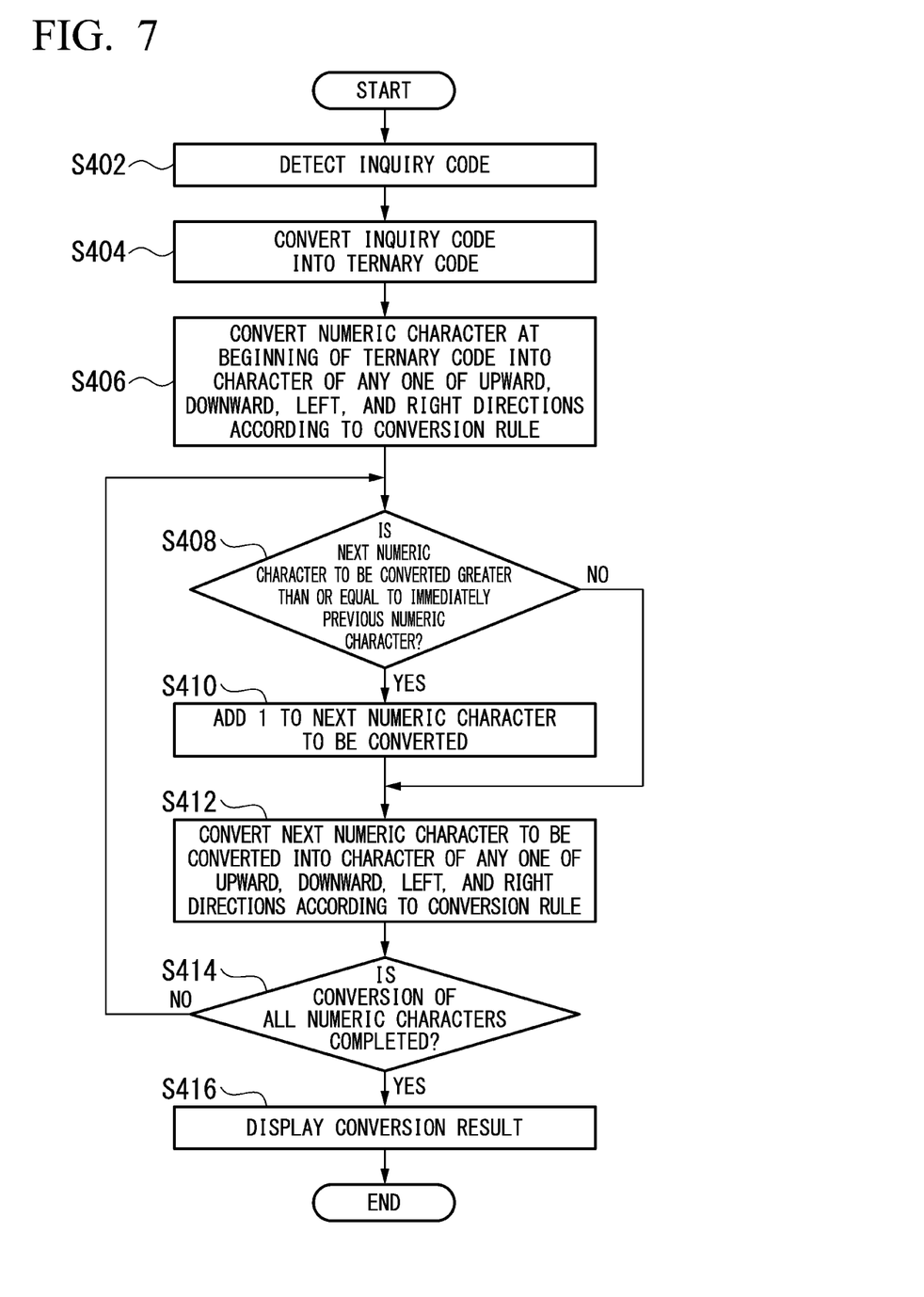
FIG. 7 is a flowchart showing a flow of a process of the supporter terminal according to the first embodiment.

The flow of the process related to the input of the release code has been described above with reference to FIG. 6. Subsequently, an example of a flow of a process of the supporter terminal 10 will be described with reference to FIG. 7. FIG. 7 is a flowchart showing the flow of the process of the supporter terminal 10 according to the first embodiment.

As shown in FIG. 7, first, the supporter terminal 10 detects an inquiry code input to the supporter 40 (S402). The supporter terminal 10 converts the detected inquiry code into a ternary code (S404). The supporter terminal 10 converts a numeric character at the beginning of the ternary code into a character of any one of the upward, downward, left, and right directions according to the conversion rule (S406).

The supporter terminal 10 determines whether or not the next numeric character to be converted is greater than or equal to an immediately previous numeric character (S408). When the next numeric character to be converted is less than the immediately previous numeric character (S408/NO), the supporter terminal 10 performs the processing of S412. On the other hand, when the next numeric character to be converted is greater than or equal to the immediately previous numeric character (S408/YES), the supporter terminal 10 adds 1 to the next numeric character to be converted (S410) and performs the processing of S412.

The supporter terminal 10 converts the next numeric character to be converted into a character of any one of the upward, downward, left, and right directions according to the conversion rule (S412).

After the conversion, the supporter terminal 10 determines whether or not the conversion of all numeric characters in the ternary code is completed (S414). When the conversion of all the numeric characters in the ternary code is not completed (S414/NO), the supporter terminal 10 iterates the process from S408. On the other hand, when the conversion of all the numeric characters in the ternary code is completed (S414/YES), the supporter terminal 10 displays a conversion result (S416) and ends the process.

(5) Flow of Process of User Terminal 20

Figure 8:
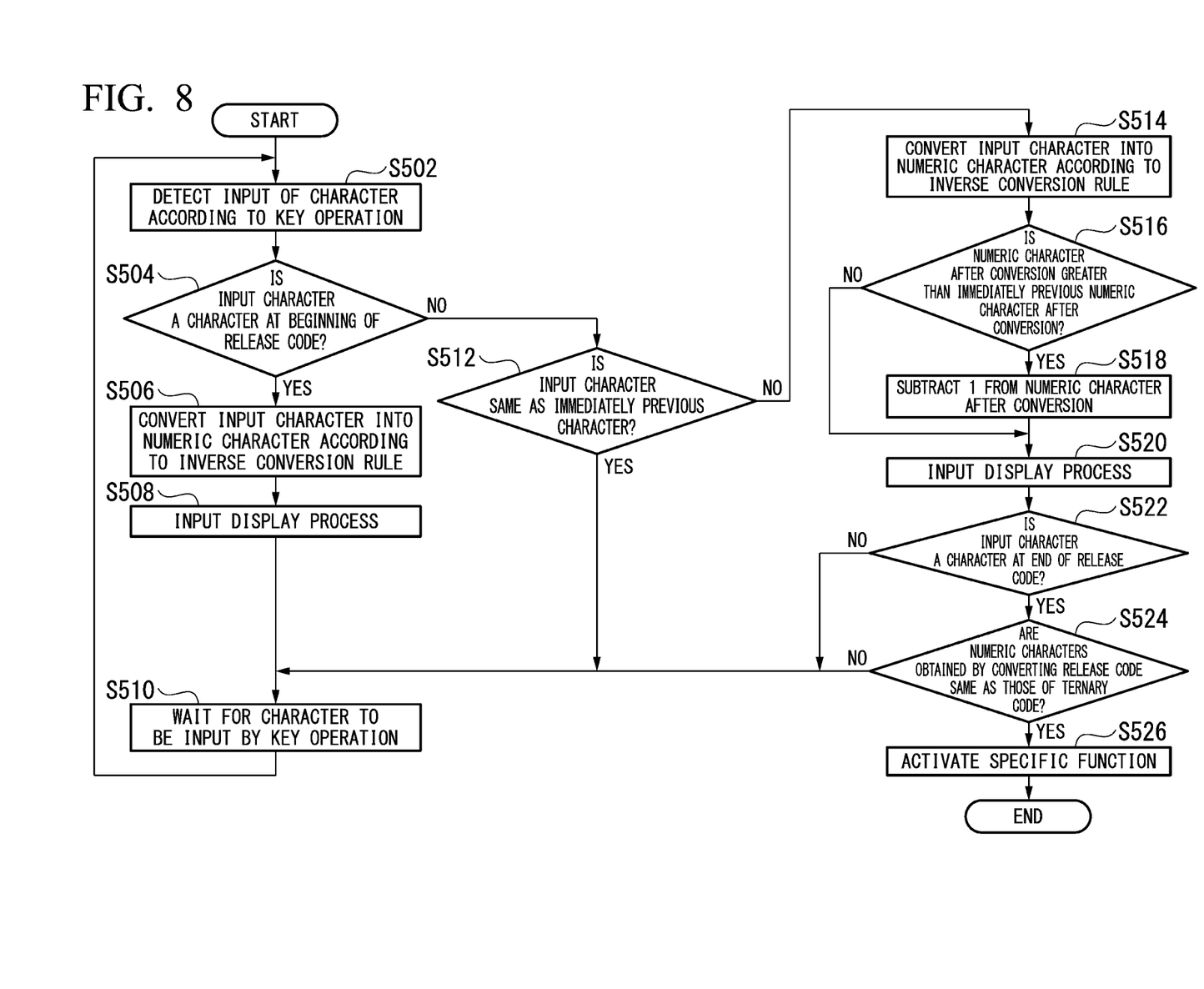
FIG. 8 is a flowchart showing a flow of a process of the user terminal according to the first embodiment.

The flow of the process of the supporter terminal 10 has been described above with reference to FIG. 7. Subsequently, an example of a flow of a process of the user terminal 20 will be described with reference to FIG. 8. FIG. 8 is a flowchart showing the flow of the process of the user terminal 20 according to the first embodiment.

As shown in FIG. 8, first, the user terminal 20 detects an input of a character according to a key operation of the user 50 (S502).

The user terminal 20 determines whether or not the input character is a character at the beginning of a release code (S504). When the input character is a character at the beginning of the release code (S504/YES), the user terminal 20 converts the input character into a numeric character according to an inverse conversion rule (S506). After the conversion, the user terminal 20 performs an input display process for the input character (S508). After the input display process, the user terminal 20 waits until the next character is input by the key operation of the user 50 (S510).

When the input character is not a character at the beginning of the release code (S504/NO), the user terminal 20 determines whether or not the input character is the same as an immediately previous character that has been input (S512). When the input character is the same as the immediately previous character that has been input (S512/YES), the user terminal 20 waits until the next character is input by the key operation of the user 50 (S510).

When the input character is different from an immediately previous character that has been input (S512/NO), the user terminal 20 converts the input character into a numeric character according to the inverse conversion rule (S514).

After the conversion, the user terminal 20 determines whether or not the numeric character after the conversion is greater than an immediately previous numeric character after the conversion (S516). When the numeric character after the conversion is not greater than the immediately previous numeric character (S516/NO), the user terminal 20 performs the processing of S520. On the other hand, when the numeric character after the conversion is greater than the immediately previous numeric character (S516/YES), the user terminal 20 subtracts 1 from the numeric character after the conversion (S518) and performs the processing of S520.

The user terminal 20 performs an input display process for the input character (S520).

After the input display process, the user terminal 20 determines whether or not the input character is a character at the end of the release code (S522). When the input character is not a character at the end of the release code (S522/NO), the user terminal 20 waits until the next character is input by the key operation of the user 50 (S510).

When the input character is a character at the end of the release code (S522/YES), the user terminal 20 determines whether or not numeric characters obtained by converting the input release code are the same as those of a ternary code (S524). When the numeric characters obtained by converting the input release code are not the same as those of the ternary code (S524/NO), the user terminal 20 waits until the next character is input by the key operation of the user 50 (S510).

When the numeric characters obtained by converting the input release code are the same as those of the ternary code (S524/YES), the user terminal 20 activates a specific function of the user terminal 20 (S526) and ends the process.

As described above, the input control device according to the first embodiment of the present invention detects an input determination target input by the key operation.

Also, the input control device determines whether or not the detected input determination target is the same as a comparison target input as a character immediately before the input determination target.

Also, the input control device accepts an input of the input determination target when it is determined that the input determination target is not the same as the comparison target without accepting an input of the input determination target when it is determined that the input determination target is the same as the comparison target.

According to this configuration, if the same character is consecutively input when a character is input by a key operation, only a character at the beginning among the consecutively input characters is accepted. Also, the input of characters other than the character at the beginning among the consecutively input characters is not accepted. Consequently, the input control device according to the first embodiment can reduce an erroneous input process in which the same character is consecutively input when a plurality of characters are input by a key operation.

Furthermore, according to this configuration, the consecutive input of the same character cannot be accepted. Thus, the user does not need to perform a complicated key operation such as an operation of inputting the next character at a time interval. Consequently, the input control device according to the first embodiment can reduce the complexity of a key operation in a character input process.

As described above, the input control device according to the first embodiment can reduce the complexity of a key operation in the character input process while preventing the erroneous input process even if a plurality of characters are input.

2. Second Embodiment

The first embodiment of the present invention has been described above. Next, a second embodiment of the present invention will be described.

<1. Functional Configuration of User Terminal>

Figure 9:
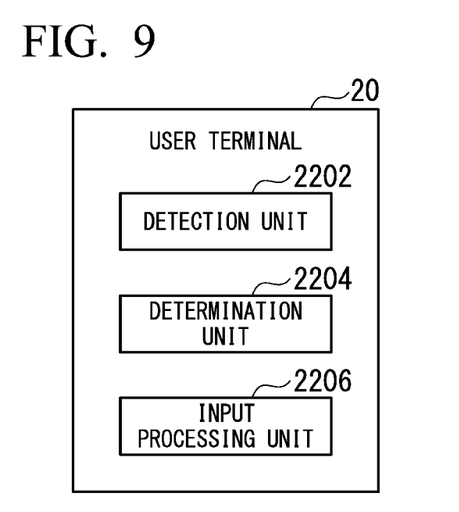
FIG. 9 is a block diagram showing a functional configuration of a user terminal according to a second embodiment of the present invention.

FIG. 9 is a block diagram showing an example of a configuration of the user terminal 20 according to the second embodiment of the present invention. As shown in FIG. 9, the user terminal 20 according to the second embodiment may include at least a detection unit 2202, a determination unit 2204, and an input processing unit 2206.

The detection unit 2202 detects an input determination target input by the key operation.

The determination unit 2204 determines whether or not the detected input determination target is the same as a comparison target input as a character immediately before the input determination target.

The input processing unit 2206 accepts the input of the input determination target when it is determined that the input determination target is not the same as the comparison target without accepting the input of the input determination target when it is determined that the input determination target is the same as the comparison target.

<2. Flow of Process>

Figure 10:
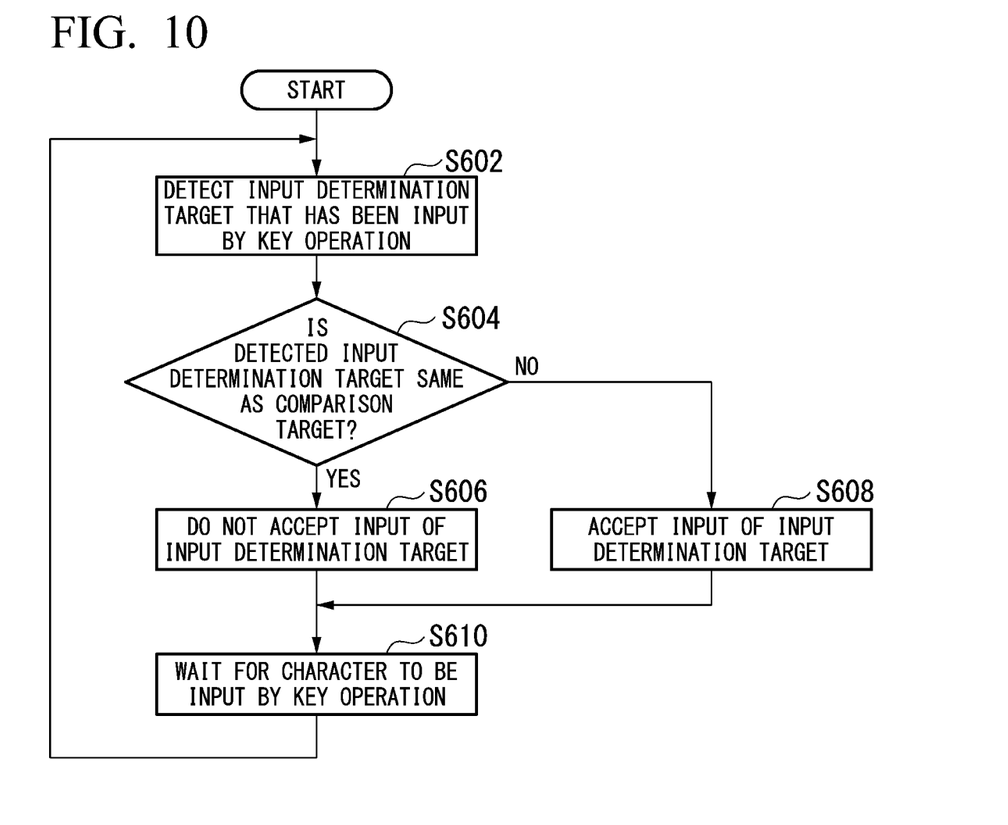
FIG. 10 is a flowchart showing a flow of a process of the user terminal according to the second embodiment.

The functional configuration of the user terminal 20 according to the second embodiment of the present invention has been described above. Next, a flow of a process of the user terminal 20 according to the second embodiment will be described with reference to FIG. 10. FIG. 10 is a flowchart showing the flow of the process of the user terminal 20 according to the second embodiment.

As shown in FIG. 10, first, the user terminal 20 detects an input determination target input by a key operation of the user 50 (S602).

Subsequently, the user terminal 20 determines whether or not the detected input determination target is the same as a comparison target (S604). When the detected input determination target is the same as the comparison target (S604/YES), the user terminal 20 does not accept the input of the input determination target (S606).

On the other hand, when the detected input determination target is different from the comparison target (S604/NO), the user terminal 20 accepts the input of the input determination target (S608).

The user terminal 20 waits until the next character is input by the key operation of the user 50 (S610).

According to this configuration, if the same character is consecutively input when a character is input by a key operation, only a character at the beginning among the consecutively input characters is accepted. Also, the input of characters other than the character at the beginning among the consecutively input characters is not accepted. Consequently, the input control device according to the second embodiment can reduce an erroneous input process in which the same character is consecutively input when a plurality of characters are input by a key operation.

Furthermore, according to this configuration, the consecutive input of the same character cannot be accepted. Thus, the user does not need to perform a complicated key operation such as an operation of inputting the next character at a time interval. Consequently, the input control device according to the second embodiment can reduce the complexity of a key operation in a character input process.

As described above, the input control device according to the second embodiment can reduce the complexity of a key operation in the character input process while preventing the erroneous input process even if a plurality of characters are input.

Embodiments of the present invention have been described above. All or some functions of the input control system 1 according to the above-described embodiment may be configured to be implemented in a computer. In this case, the functions of the input control system 1 may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a flexible disk, a magneto-optical disc, a ROM, a portable medium such as a compact disc (CD)-ROM, or a storage device such as a hard disk embedded in the computer system. Further, the "computer-readable recording medium" may include a computer-readable recording medium for dynamically retaining the program for a short time period as in a communication line when the program is transmitted via a network such as the Internet or a communication circuit such as a telephone circuit and a computer-readable recording medium for retaining the program for a given time period as in a volatile memory inside the computer system including a server and a client when the program is transmitted. Also, the above-described program may be a program for implementing some of the above-described functions. Further, the above-described program may be a program capable of implementing the above-described function in combination with a program already recorded on the computer system or may be a program implemented using a programmable logic device such as a field programmable gate array (FPGA).

Although embodiments of the present invention have been described above in detail with reference to the drawings, specific configurations are not limited to the embodiments and various design changes and the like may be made without departing from the scope of the present invention.

REFERENCE SIGNS LIST

1 Input control system
10 Supporter terminal
20 User terminal
110 Operation unit
120 Control unit
130 Display unit
140 Storage unit
210 Operation unit
220 Control unit
230 Display unit
240 Storage unit
1202 Detection unit
1204 Conversion unit
1206 Determination unit
1208 Display processing unit
2202 Detection unit
2204 Determination unit
2206 Input processing unit
2208 Display processing unit
2210 Conversion unit

What is claimed is:

1. An input control device comprising:
   a detection unit configured to detect a first character input by a key operation;
   a determination unit configured to determine whether or not the detected first character is the same as a second character input immediately before the first character; and
   an input processing unit configured to accept an input of the first character if the determination unit determined that the first character is not the same as the second character, the input processing unit configured not to accept the input of the first character if the determination unit determined the first character is the same as the second character,
   wherein, when the first character is a character at the beginning of a string input by the key operation, the determination unit does not determine whether or not the first character is the same as the second character and the input processing unit accepts the input of the first character.

2. The input control device according to claim 1, wherein, when a character at the end of a string input by the key operation has been accepted, the determination unit determines correctness of the string input by the key operation.

3. The input control device according to claim 1, wherein a string input by the key operation is generated so that the first character is different from the second character.

4. The input control device according to claim 3, wherein the string input by the key operation is a string obtained by converting a string shown in a decimal system into another string shown in a ternary system and converting the string shown in the ternary system on the basis of a prescribed rule.

5. The input control device according to claim 3, wherein the string input by the key operation is a string converted so that each character corresponds to any one of keys indicating upward, downward, left, and right directions on the basis of a prescribed rule.

6. The input control device according to claim 5, further comprising:
   a conversion unit,
   wherein the conversion unit converts the first character whose input has been accepted into a character before conversion on the basis of the prescribed rule.

7. The input control device according to claim 6, wherein the determination unit compares a string that has been generated so that the first character is different from the second character with another string including characters obtained after a conversion process of the conversion unit and determines correctness of the string input by the key operation on the basis of whether or not the strings are the same.

8. The input control device according to claim 1, further comprising:
   a display processing unit configured to control display of the first character that has been input,
   wherein the display processing unit performs an input display process of displaying information indicating that the first character has been input when the input of the first character has been accepted without performing the input display process when the input of the first character has not been accepted.

9. The input control device according to claim 1, wherein a string input by the key operation is a password.

10. An input control method comprising:
    detecting, by a detection unit, a first character input by a key operation;
    determining, by a determination unit, whether or not the detected first character is the same as a second character input immediately before the first character;
    accepting, by an input processing unit, an input of the first character when the determination unit determined that the first character is not the same as the second character, and
    unaccepting the input of the first character when the determination unit determined that the first character is the same as the second character,
    wherein, when the first character is a character at the beginning of a string input by the key operation, the input of the first character is accepted by the input processing unit, without determining whether or not the first character is the same as the second character.

11. A non-transitory computer readable state medium that stores computer program instructions for causing a computer to perform:
    detecting a first character input by a key operation;
    determining, by a determination unit, whether or not the detected first character is the same as a second character input immediately before the first character;
    accepting, by an input processing unit, an input of the first character when the determination unit determined that the first character is not the same as the second character, and
    unaccepting the input of the first character when the determination unit determined that the first character is the same as the second character,
    wherein, when the first character is a character at the beginning of a string input by the key operation, the input of the first character is accepted by the input processing unit, without determining whether or not the first character is the same as the second character.

12. The input control device according to claim 1, wherein the determination unit is configured to determine whether or not the detected first character is the same as the second character input immediately before the first character in case that the first and second characters are in a string of characters.

* * * * *